United States Patent Office

3,798,339
Patented Mar. 19, 1974

3,798,339
PREPARATION OF A MILK SUBSTITUTE PRODUCT
Andrew Chung-Yen Peng, Columbus, Ohio, assignor to Swift & Company, Chicago, Ill.
No Drawing. Continuation-in-part of application Ser. No. 644,788, June 9, 1967. This application May 13, 1968, Ser. No. 728,763
Int. Cl. A23c *11/00*
U.S. Cl. 426—357                              7 Claims

ABSTRACT OF THE DISCLOSURE

A highly nutritious milk-substitute type product is prepared by mixing soybean material with certain milk materials or by-products, particularly whey, in a liquid mixture and then boiling and grinding the mixture to a smooth consistency. The characteristic beany flavor of soybean materials will thereby be greatly reduced. Full-fat, defatted toasted and untoasted whole and cracked beans as well as flaked beans and soy flour may be utilized. The mixture thus prepared may be further processed to produce a dry powder that can be reconstituted by mixing with water.

---

This application is a continuation-in-part of my co-pending application Ser. No. 644,788, which was filed June 9, 1967 and is now abandoned.

The invention relates to a new and improved method for producing nutritional food products and the product produced thereby. More particularly, it relates to a new and improved milk-substitute type product and method for producing such a milk-substitute type product from soybeans and certain milk materials or milk by-products.

The generally accepted processes for producing milk-substitute type products have been of two basic types each including a step of heating a soybean material in water. One of these previously proposed processes entails the steps of hydrating dehulled, full-fat soybeans, grinding the soybeans with water, followed by heating the mixture to boiling and filtering out the residue. The other general procedure which has been employed previously comprises hydrating soy flour with a stabilizer and milk solids in an alkaline solution, followed by brief heating to 190°–240° F., then homogenizing, centrifuging and formulating the product.

However, both of these processes have exhibited several disadvantages which have not heretofore been overcome. First, the previously proposed processes have not overcome the long-standing problem with regard to the characteristic aroma, flavor, or bitterness of soybean products. Mere boiling of soybean materials in water does not eliminate the characteristic grassy aroma, beany flavor or bitterness of soybeans. This factor has constituted the primary barrier to consumer acceptance of these products. The average consumer finds the "beany" and bitter taste and "grassy" aroma which can be detected in previous soybean milk-substitute type products to be objectionable and, thus, has inhibited any extensive acceptance of such products. Furthermore, there has been a problem as to the relatively low yield obtained when these processes are employed, particularly when dehulled full-fat beans are employed. Additionally, the previously proposed processes have been time consuming and thus economically disadvantageous.

I have discovered that soybeans can be processed in a solution of certain milk materials or by products, particularly certain cheese wheys, without any further adjustment of alkalinity so as to overcome these disadvantages. As a result, it is possible to produce an economical and improved soybean beverage base and, also, to profitably utilize to advantage a heretofore wasted milk byproduct such as whey left from cheese manufacture.

It is, therefore, an object of the present invention to provide a new and improved product and method for preparing a bland, nutritional milk-substitute type product from soybeans which is relatively free of the characteristic aroma, flavor and bitterness of soybeans.

A still further object is to provide a new, improved and simplified method for producing milk-substitute type products from soybeans which will reduce the processing time and consequently reduce the cost of preparing the product.

Another object of the present invention is to produce an improved soybean beverage base by a process advantageously utilizing certain milk materials and milk byproducts.

Still another object of the present invention is to improve the quality and utility of certain milk materials and milk byproducts.

Additional objects, if not specifically set forth herein, will be readily apparent to those skilled in the art from the detailed description of the invention which follows.

Generally, the instant method comprises forming a mixture of a full-fat soybean material in an aqueous solution of milk material or milk byproducts including whole milk, skim milk, neutralized buttermilk (the liquid remaining following butter churning of sour cream previously neutralized to about pH 6.6), lactose, and particularly certain cheese wheys. Whey is the serum which remains after the coagulation of the casein and fat when cheese is manufactured and comprises principally water and 6% to 7% solids such as lactose, lactalbumin, and most of the ash of the original milk. Cheese whey usually is slightly acid due to the ripening process in cheese manufacture. The degree of acidity is dependent upon the extent ripening is continued, but it is believed that most fresh cheese wheys, expecting cottage cheese whey, immediately upon removal from the processing vat are pH 6.0 or higher. (Cottage cheese whey is usually pH 5.0 or lower.) However the whey will continue to become more acid, if bacterial action is not halted, until pH declines to about 4.5, whereupon most bacterial action will cease. Pasteurization of whey will also halt bacterial action and fix the pH value. Similarly spray drying whey to form a powder will arrest the pH value, and dried food-grade wheys are usually found to be about pH 6.3.

It is necessary that the mixture of milk material and soybean material be no more than slightly acid, displaying about pH 6 or higher. Subsequently, the mixture is heated to boiling (which is about 214° F. for cheese whey) and held for a period of about 0 to 40 minutes and preferably for a period of 10 to 30 minutes. This cooked product may be employed without further processing as a nutritional and relatively flavorless and odorless milk-substitute type product. However, the mixture may be dried to remove moisture and produce a powdered milk-substitute type beverage base product. This powdered product can easily be rehydrated, either immediately or after storage in dry form, into a bland, nutritive beverage of the milk-substitute type. The product may also be used as a milk solid substitute in the baking industry and the like.

More specifically, the method of the instant invention comprises soaking a soybean material such as dehulled whole soybeans, cracked soybeans, soy meal, soy flakes, soy flour, and mixtures thereof, in solution of certain milk materials for a period of 0 to 8 hours. The more finely divided material requires less soak time, with soy flour requiring no soaking and whole beans requiring 7 to 8 hours. Although the temperature at which the beans are soaked in the solution is not critical, where long soaking is necessary it is preferred that the temperature be fairly low (e.g., in a range of from about 32° to 40° F.) to prevent deterioration of the soybean protein during the soaking period. The soybean material may be either toasted or untoasted and may be either defatted or full fat. The greatest reduction in beany flavor probably is obtained by processing soy flour. Highly improved taste can also be obtained with full-fat material to produce a more nutritious product. Also full-fat soy material will result in a product of superior appearance and texture more closely resembling cow's milk.

The milk material solution to be employed may be either fresh (i.e., obtained in liquid form from milk or food processes utilizing milk), for example, fresh cheese whey; or a solution prepared from a dried milk product, such as whey powder or skim milk powder, etc. The ratio of soybean material to milk material employed herein should be in the range of from about 1:4 to about 2:1 (solids basis).

I have found that not all milk materials will obtain the benefits of my discovery, and the distinction appears to be that the mixture of milk material and soybean material should be about pH 6 and greater. Acid mixtures below about pH 6 are thought to be inoperative in that insufficient flavor improvement is obtained. It appears that milk materials having acidity of pH 5 and lower will not result in suitable mixtures. In selecting operative ingredients it must be considered that the soybean material in water will usually be about pH 6.5 and will act as a buffer when acid materials are added. Similarly certain milk materials, such as whey, have a buffering effect. Thus, the relative amounts of some ingredients will affect their operativeness. I have found that lactic acid solutions per se and most cottage cheese whey are too acid and will not provide beneficial results within the limits of the invention. However, most Italian and cheddar cheese wheys, skim milk, neutralized buttermilk, lactose and whole milk are beneficial.

In a preferred embodiment of the present invention, a ratio of soybeans to cheddar cheese whey of from about 1:2 to about 2:1 (solids basis) is employed, with a most preferred ratio in a range of from about 1:2 to 1:1 (solids basis). It has been found that if the milk material content of the mixture is greater than about 4 parts to each part of soybean employed, certain unpleasant milk flavors may predominate. For instance, a mixture having greater than 4 parts whey solids per part of soybean material will exhibit a distinct whey flavor and aroma which will ordinarily render the product undesirable for consumer acceptance. Also in the case of whole milk or skim milk, certain undesired boiled flavors become detectable. On the other hand, when greater than about 2 parts of soybean material is employed per part of milk material, the final product will tend to exhibit a beany flavor which will also render the product generally undesirable. The pH of the soybean-whey mixture may be adjusted to insure a liquid product of pH comparable to cow's milk (which is in the range of pH 6.3–7.3); however, this step is not necessary, other than pH 6 is a minimum requirement for the mixture. The mixture displays a buffering action and if the initial pH is adjusted between 6–8 the end product will be in the range of about 6.3–7.3. The higher pH is believed to promote slightly superior taste.

After the soybean material has been allowed to soak in the milk material solution for a sufficient period of time to render the material soft enough to be milled or ground, the mixture is cooked to boiling. For best results, it has been determined that boiling should be continued in an open or exhausted vessel for a period of from about 10 to about 30 minutes, and preferably for about 15 minutes. This boiling step has been found to achieve several desirable results. It has been found that boiling the mixture eliminates the beany or grassy flavor and aroma, which has been a major problem heretofore, and produces a product of a bland unobjectionable taste and odor. This feature was surprising and unexpected since boiling of soybean materials, in water, as has been common practice heretofore in preparing soy-milk products, has not eliminated this characteristic beany and grassy flavor and aroma; and the boiling of milk materials has been avoided in the prior art as causing distinctive and unpleasant taste and odors. However, the present process reduces the bitter flavor which has traditionally been associated with products of this kind, and especially reduces the bitter aftertaste. Additionally, as has been previously recognized in the art, boiling soybean material will reduce the antitryptic factors inherent in soybeans and, therefore, the final product will not adversely affect human digestion by inhibiting trypsin activity in the body of a consumer.

The mixture of soy material and milk material should be milled or ground (particularly where whole, cracked or flaked beans are used), either before or after cooking of the mixture, in order to reduce the particle size in solution so that the final product will have a uniform and fine texture.

The cooked mixture, which has been milled, may be utilized without further processing as a whole milk-substitute type beverage. However, additional processing steps such as evaporation, homogenization and the like, may be employed subsequently if desired, and particularly if a dried product is to be prepared. Vacuum evaporization is believed to impart a further slight improvement in taste. Formulation by adding sugars and desired flavoring materials may also be practiced. Additionally, if it is desired to prepare a dry milk-substitute type beverage base, the cooked mixture can be dried by any convenient method such as jet-drying, spray-drying, freeze-drying and the like. Homogenization prior to drying is highly beneficial for developing stability in the reconstituted product. The dried, powdered product prepared thereby is easily rehydrated into a stable, nutritive beverage very similar in composition and physical characteristics to cow's milk.

It has been found that the above described process, in addition to providing a beneficial and novel manner of utilizing soybean protein, is also a significant advance in the food art from the standpoint that it upgrades and makes useful milk products of poor quality or milk products heretofore having little utility and being essentially waste materials. For instance, under certain climatic conditions bacterial growth may occur in milk, or improper or antiquated collection and storage systems may contaminate milk with bacteria or debris. Also disease may infect dairy animals, thus adversely affecting the milk supply. These problems are substantial in many parts of the world. In such instances, heat treatment is called for; however, pasteurization, involving only moderate thermal conditions (such as temperatures of 140°–160° F. for a few minutes or higher temperatures for even briefer periods) may not be sufficient if contamination is severe. The latter condition requires heat treatment approaching sterilization at temperatures of 212° F. or greater for substantial periods of time which usually adversely affects the taste and appearance of milk. However, according to the present invention, the boiling of whole milk if contaminated to a significant degree, for periods up to as much as 40 minutes, when in mixture with soybean solids to improve the flavor, will inherently effect thermal destruction of great numbers of contaminants.

Similarly, whole milk having strong, undesirable or offensive flavors and/or odors may be benefited and upgraded by the present process. Such whole milk is obtained in certain seasons from bovines grazing on certain plants; and from any other animals, such as goats, which milk is considered by many persons as being unpalatable. The milk of some species displays an inadequate protein to fat balance from the standpoint of human nutrition, and may also be benefited and improved by the present invention. For example, whole milk from the Indian buffalo (Bubalus Bubalus) is very rich in fat content but relatively low in protein. By processing according to the present invention, such milk can be upgraded to higher protein content and effectively extended to supply the nutritional needs of greater numbers of humans.

Most surprisingly, however, the process enables beneficial and economical use of a heretofore largely wasted byproduct, namely cheese whey. However, since the milk ripening process in cheese making involves the development of acid, and since acid starters such as lactic acid are commonly employed, it has been found that some cheese wheys cannot be used if acid development has continued below pH 5.0. I have found that cheddar cheese whey (cheddar cheese accounting for perhaps 75% of all U.S. cheese production) aged to pH 5.5 is suitable for practicing the present invention. Similarly, Italian cheese whey is usually reliable. Cottage cheese whey, however, is most often below pH 5.0 and cannot normally be expected to be utilized with the same degree of desired result.

The following examples are intended to illustrate specific embodiments of the invention and should not be considered to impose any limitations on the invention.

EXAMPLE I

A 1 to 1 ratio (solids basis) of clean, dehulled cracked soybeans (7 lbs.) and fresh Italian cheese whey (100 lbs. with 7% whey solids) of pH 6.3 were soaked for about 8 hours. Then the mixture of pH 6.5 was heated to boiling in a 45-gallon round processor and held at boiling for 15 minutes. The whole mixture was then ground and filtered through a wire screen. The resulting slurry was then jet dried. The dry product was a slightly yellowish white powder, and had a sweet taste and a bland flavor. The dried product was readily rehydrated into a milk-substitute type liquid product of neutral pH around 6.8.

EXAMPLE II

Twenty-seven pounds of clean, dehulled, full-fat cracked soybeans were soaked in 400 pounds of fresh cheese whey of pH 5.6 for about 8 hours at 32°–40° F. The mixture was boiled in a 45-gallon round processor for 15 minutes, evaporated under vacuum of 27 inches for 15 minutes, and cooled down to 100° F. The mixture was then processed by the method of Example I and the final dry product was slightly yellowish white, had a sweet taste and a bland flavor, and dispersed readily.

EXAMPLE III

Five pounds of clean, dehulled, cracked, full-fat soybeans and 8 pounds of 62% solids of concentrated cheese whey (pH 5.6) were diluted with 87 pounds of water and mixed thoroughly. The whole mixture was heated to boiling in a stainless steel steam-jacketed vessel with constant agitation, and held at boiling for 4 minutes under a careful control of steam to avoid foaming. The boiled product was ground, filtered through a wire screen and jet dried. The final product had a sweet taste and bland flavor and was a light yellow color.

EXAMPLE IV

Seventy grams of full-fat, cracked soybeans and 140 grams of Italian cheese whey powder were mixed with 1,000 grams tap water, producing a mixture of 1:2 solids basis ratio and pH 6.4. This mixture was soaked only during the time required to heat to boiling and was boiled for 15 minutes and then blended for 2 minutes in a Waring blender operated at medium speed. Thereafter the mixture was filtered through four layers of cheesecloth and the filtrate cooled to room temperature. A taste panel of eight trained members sampled the liquid product and rated it according to a scale of 1–6, representing a range of no beany flavor to very much bean flavor, respectively, on average at 2.91. The test was repeated using a 2:1 solids basis ratio by mixing 140 grams cracked soybeans and 70 grams whey powder in 1000 grams water. Taste panel rating was 3.16. These figures compare favorably with a reference taste rating of 3.94 assigned contemporaneously to a mixture of 70 grams beans ground and boiled in 1000 grams water.

EXAMPLE V

The procedure of Example IV was repeated for 1:2 and 2:1 solids, ratios of cracked soybeans in neutralized buttermilk, skim milk, lactose and whole milk. Taste panel evaluations were tabulated against contemporaneous standard reference ratings for 70 grams beans ground and boiled in 1000 grams water.

| Solution | Solids ratio 1:2 | Solids ratio 2:1 | Reference |
|---|---|---|---|
| Neutralized buttermilk | 2.53 | 3.35 | 4.69 |
| Skim milk | 2.63 | 3.13 | 4.88 |
| Lactose | 2.38 | 3.07 | 4.50 |
| Whole milk | 3.13 | 2.76 | 4.75 |

EXAMPLES VI–X

The following examples demonstrate that various forms of soybean material may be processed according to the invention. In each example a 1:1 ratio (solids basis) of soybean to whey was prepared by mixing 105 grams soybean material with 105 grams whey powder and 1500 grams tap water. Each mixture was then ground and then heated and boiled for 15 minutes in a steam jacketed vessel. Thereafter each mixture was evaporated at 27 inches vacuum for 15 minutes, homogenized in standard equipment at 2,500 p.s.i. and then freeze-dried. Samples of each dried product were reconstituted on the basis of 10 grams dry powder to 100 grams tap water; and the reconstituted products evaluated, by two taste panels each comprising eight trained members, according to the scale of Example IV.

| Ex. | Soybean material | Average taste score |
|---|---|---|
| VI | Full-fat flour | 2.855 |
| VII | Full-fat toasted flour | 3.285 |
| VIII | Full-fat untoasted cracked bean | 3.855 |
| IX | Defatted toasted flour | 2.645 |
| X | Defatted untoasted flour | 2.355 |

EXAMPLES XI–XIII

These examples demonstrate that boiling of the soybean-milk material (whey) mixture is essential to the invention, and that vacuum evaporation is beneficial where producing a dried product. In each instance a 1:2 solids basis ratio of soybean to whey was prepared by mixing 470 grams full-fat cracked soybeans with 940 grams cheddar cheese whey powder and 20 lbs. tap water. The mixtures were all finally homogenized at 2,500 p.s.i. and freeze-dried and then reconstituted and sampled by a taste panel similar to Examples VI–X.

| Ex. | Treatment prior to homogenization | Taste score |
|---|---|---|
| XI | Ground and vacuum evaporated at 27 in. for 15 minutes. | 4.77 (oily taste). |
| XII | Ground boiled for 15 min. vacuum evaporated at 27 in. for 15 minutes. | 2.73. |
| XIII | Ground boiled for 15 minutes (no evaporation). | 3.52 (starchy). |

EXAMPLES XIV–XXV

In the following examples the optimum boiling time was sought. In each instance a 1:1 solids ratio mixture was prepared by mixing 200 grams full-fat cracked soybeans with 200 grams whey powder and 2000 grams tap water. Each mixture was ground, heated to boiling temperature (and held for the designated period), then evaporated at 27 inches vacuum for 15 min., homogenized at 2,500 p.s.i., and finally freeze-dried. Samples were reconstituted and taste evaluated as in previous examples. (It is believed that a taste panel score of 4 or more indicates a clearly unacceptable product, whereas a score below about 3.5 indicates a product acceptable to a significant percentage of persons with lower scores providing greater assurance of acceptability. However a comparison of panel scores must also take into account personal variations from day to day and in this regard departure from reference taste ratings become significant.)

| Ex. | Boiling period | Taste score |
|---|---|---|
| XIV | Not heated | 4.38 |
| XV | Heated to boiling but not held | 3.33 |
| XVI | Boiled for 5 minutes | 3.50 |
| XVII | Boiled for 10 minutes | 2.67 |
| XVIII | Boiled for 15 minutes | 2.50 |
| XIX | Boiled for 20 minutes | 3.13 |
| XX | Boiled for 25 minutes | 2.62 |
| XXI | Boiled for 30 minutes | 3.23 |
| XXII | Boiled for 35 minutes | 2.58 |
| XXIII | Boiled for 40 minutes | 3.33 |
| XXIV | Boiled for 45 minutes | 3.90 |
| XXV | Boiled for 50 minutes | 4.56 |

The invention was found to be equally applicable to several milk materials, while not applicable to two others, by the following examples wherein the specified materials were mixed, heated and held at boiling for 15 minutes (while constantly stirred) and then spray dried. Taste panels comprised of trained evaluators sampled reconstituted beverages prepared with 40 grams of spray dried powder in 400 ml. water. Each example was repeated using the same quantities of cracked full-fat beans, defatted flour, and defatted flour plus 20% soybean oil in mixtures containing equal ratios of milk product solids (the amount of lactose and lactic acid were determined to be equivalent to the amount of each that would be present in equal ratios of whey solids to soybean materials). The taste panel evaluated each sample on a scale according to Example V.

EXAMPLE XXVI

Three batches of neutralized buttermilk testing at pH 6.7 were prepared by mixing (for each) 800 ml. water and 100 grams neutralized buttermilk powder (sour cream had been neutralized to pH 6.6, then butter churned and the remaining fluid spray dried). To one batch 100 grams of beans was added and soaked 4 hours, thereafter ground and then boiled and spray dried. To the second batch 100 grams of defatted flour was added, mixed in a Waring blender, immediately boiled and then spray dried. To the third batch was added 80 grams of defatted flour plus 20 grams soybean oil which was mixed in a Waring blender and immediately boiled and spray dried. Results are tabulated in the table below.

EXAMPLE XXVII

Three batches of Italian cheese whey testing pH 6.3 were reconstituted by dispersing (for each) 100 grams Italian cheese whey powder in 800 ml. water. Thereafter the procedures of Example XXVI were repeated with the successive batches and the results tabulated below.

EXAMPLE XXVIII

Three batches of cheddar cheese whey testing pH 5.6, were reconstituted from cheddar cheese whey powder and processed according to Example XXVI and results tabulated below.

XXIX

Three batches of skim milk, testing pH 6.6, were reconstituted by dispersing (for each) 100 grams of skim milk powder in 800 ml. water. The batches were then processed as in Example XXVI and the results tabulated below.

EXAMPLE XXX

Three batches of lactose solution, testing pH 7.1, were prepared by dispersing 112.5 grams reagent grade lactose (equivalent to the amount that would be present in 150 grams of whey powder) in 800 ml. water. The batches were processed as in Example XXVI but utilizing 150 grams cracked beans, 150 grams defatted flour and 120 grams flour plus 30 grams soybean oil, respectively. The results are tabulated below.

EXAMPLE XXXI

Three batches of cottage cheese whey, testing pH 4.9, were reconstituted from cottage cheese whey powder and processed according to Examples XXVII and XXVIII and the results tabulated below.

EXAMPLE XXXII

Three batches of lactic acid solution, testing pH 3.1, were prepared by dispersing (for each) 3.3 grams reagent grade lactic acid (equivalent to the amount that would be present in 200 grams of whey powder) in 800 ml. water. The batches were processed as in Example XXVI but utilizing 200 grams cracked beans, 200 grams defatted flour, and 160 grams defatted flour plus 40 grams soybean oil, respectively. The results are tabulated below.

EXAMPLE XXXIII

As a standard of comparison, water alone was used to process the soybean material. Batches were prepared utilizing 100 grams cracked beans, 100 grams defatted soy flour, and 80 grams flour plus 20 grams soybean oil, each in 900 ml. water. The results are also tabulated below.

TABLE.—TASTE PANEL RESULTS

| Example | Solution | Beans | Flour | Flour and oil | Average |
|---|---|---|---|---|---|
| XXVI | Neutralized buttermilk (pH of mixture) | 2.46 (7.0) | 2.26 (6.8) | 1.76 (6.9) | 2.16 |
| XXVII | Italian cheese whey (pH of mixture) | 2.75 (6.5) | 2.17 (6.5) | 2.28 (6.5) | 2.40 |
| XXVIII | Cheddar cheese whey (pH of mixture) | 2.42 (6.2) | 2.64 (6.2) | 2.19 (6.2) | 2.42 |
| XXIX | Skim milk (pH of mixture) | 2.57 (6.9) | 2.18 (6.8) | 2.70 (6.8) | 2.48 |
| XXX | Lactose (pH of mixture) | 3.16 (6.8) | 2.17 (6.8) | 2.40 (6.8) | 2.58 |
| XXXI | Cottage cheese whey (pH of mixture) | 2.94 (5.4) | 3.85 (5.7) | 2.88 (5.6) | 3.22 |
| XXXII | Lactic acid (pH of mixture) | 3.47 (5.8) | 3.42 (6.0) | 3.00 (6.0) | 3.29 |
| XXXIII | Water (pH of mixture) | 3.44 (7.1) | 4.29 (7.2) | 3.02 (7.2) | 3.58 |

The foregoing tests illustrate the substantial reduction in beany flavor brought about in Examples XXVI and XXX. Examples XXXI and XXXII were deemed to represent inadequate benefication. Evaluations in each column are results of averaged data, and in certain instances inconsistencies may appear (for instance, the values of 3.16 for lactose treated beans and 4.29 for water treated flour may reflect abnormal error). However, the last column of average reported data is meaningful and its appears to confirm that significant reduction in beany flavor was obtained by processing mixtures of soybean material in solutions of lactose, skim milk, cheddar and Italian cheese wheys and neutralized buttermilk, such mixture ranging upward from pH 6.0. Other tests not reported here also confirm similar results were obtained when the ratio of soybean to milk material solids were altered within the range hereinbefore defined.

Obviously many modifications and variations of the invention as hereinbefore set forth may be made without departing from the spirit and scope thereof, and, therefore, only such limitations should be imposed as are indicated in the appended claims.

I claim:

1. A method for producing a bland, nutritional milk-substitute type beverage from a soybean material comprising: mixing a protein containing soybean material selected from the group consisting of dehulled whole soybeans, cracked soybeans, soy meal, soy flakes, soy flour and mixtures thereof in a solution of natural milk material of at least pH 5 in a ratio ranging between 1 part soybean material solids to 4 parts milk material solids and 2 parts soybean material solids to 1 part milk material solids which result in a pH of at least 6.0; soaking the soybean material in the milk material for a period of 0 to 8 hours sufficient to render said material soft enough to be ground; thereafter heating the mixture to be boiling point and holding at boiling for a period of about 10–40 minutes; and grinding the mixture to a smooth liquid consistency.

2. The method of claim 1 wherein a mixture of soybean material and milk material is milled after boiling.

3. The method of claim 2 wherein a mixture of whole soybeans and milk material is first soaked for about 8 hours.

4. The method of claim 1 wherein the soybean material is soaked in the milk material solution only for the period required to bring the mixture to the boiling point.

5. The method of claim 1 including drying the boiled and ground mixture to form a powdered product which can be rehydrated into a milk-substitute type product.

6. The method of claim 5 wherein the boiled and ground mixture is homogenized before being dried.

7. The method of claim 1 wherein the milk material is selected from the group consisting of whole milk, skim milk, neutralized buttermilk, Italian cheese whey, cheddar cheese whey, lactose and mixtures thereof.

References Cited

UNITED STATES PATENTS

| 2,078,962 | 5/1937 | Miller | 99—64 |
| 2,555,514 | 6/1951 | Sharp et al. | 99—57 |

FOREIGN PATENTS

| 672,940 | 5/1952 | Great Britain | 99—57 |
| 111,081 | 1936 | Japan. | |

OTHER REFERENCES

Sasaki et al., The Manufacture of Synthetic Milk Powder from Whey and Soybean. Proceedings 13th International Dairy Conference, vol. 4, 1953 (pp. 606–610).

Sasaki et al., The Manufacture of Synthetic Milk Powder from Whey and Soybean. Proceeding 13th International Dairy Conference, vol. 4, 1953 (pp. 602–605).

DAVID M. NAFF, Primary Examiner

U.S. Cl. X.R.

426—358, 518, 519, 801